United States Patent [19]

Commins

[11] Patent Number: 4,744,192
[45] Date of Patent: May 17, 1988

[54] TENSION TIE

[75] Inventor: Alfred D. Commins, Danville, Calif.

[73] Assignee: Simpson Strong-Tie Company, Inc., San Leandro, Calif.

[21] Appl. No.: 48,090

[22] Filed: May 11, 1987

[51] Int. Cl.[4] ............................. E04I 3/8; E02D 27/00
[52] U.S. Cl. .................................... 52/714; 403/232.1
[58] Field of Search ............... 403/190, 232.1; 52/713, 52/714, 715, 702, 295, 296, 677; 248/58, 59, 62

[56] References Cited

U.S. PATENT DOCUMENTS 4,067,168  1/1978  Thurner ............................. 52/733

FOREIGN PATENT DOCUMENTS 27294  10/1954  Finland ............................. 248/59

OTHER PUBLICATIONS

Simpson Strong-Tie Catalog, pp. 8 and 10, Copyright 1987.

Primary Examiner—John E. Murtagh
Attorney, Agent, or Firm—James R. Cypher

[57] ABSTRACT

A tension tie for holding a wood frame member subject to a design load in tension to a wood or concrete member. The tie is connected to the wood frame member by nail fasteners and to the concrete or wood member by an anchor bolt. The tension tie is constructed from sheet metal and includes an elongated strap member which is connected to a foot member by means of a rivet. The foot member is characterized by a single sheet continuous seat member connected to side members which in turn are connected to overlapped back members joined by the same rivet used to connect the foot member to the strap member.

8 Claims, 5 Drawing Sheets

TENSION TIE

BACKGROUND OF THE INVENTION

Simpson Strong-Tie Company, Inc., the assignee of this application is also the owner of copending application Ser. No. 6-714,616 filed Mar. 20, 1985 entitled ONEPIECE, NON-WELDED HOLDOWN, Assignment recorded, Patent and Trademark Office Mar. 20, 1985, Reel 4387 Frame 296now U.S. Pat. No. 4665,672 granted May 19,1987. A terminal disclaimer has been filed with the present application pursuant to meeting the requirements of Guideline 14 of the Assistant Commissioner for Patents set forth in 1050 OG 316.

This invention relates to sheet metal tension ties which are used to strengthen structural building members against forces imposed by earthquakes, hurricanes, typhoons and water related forces such as wave action. Tension ties are used in combination and in addition to standard structural connectors.

Specifically, the present tension tie is connected to a concrete member by a threaded bolt anchored in a concrete wall. The threaded bolt may be set in the concrete wall at the time it is poured or embedded in the concrete wall by drilling and grouting after the wall is poured.

The nearest product available commercially are seismic wall ties which must be embedded in the concrete wall at the time the wall is poured. These embedded type ties cannot be retrofitted.

The only other product on the market which connects to an embedded threaded anchor bolt is a product known as a holdown. Holdowns have been bolted to foundations and bolted to upright members. Such holdowns did not provide any means to nail the strap member to the structural wood member.

SUMMARY OF THE INVENTION

The gist of the present invention is the use of a sheet metal member which is joined to a wood structural member by nails or bolts and to either a wood or concrete structural member by a threaded bolt.

An object of the present invention is provide a tension tie which may be either added to the structure at the time of construction or retrofitted after construction.

A further object is to provide a tension tie which is constructed entirely from sheet metal and requires no welding or painting.

Another object is to provide a tension tie as described at the lowest production cost and the lowest installation cost.

DESCRIPTION OF THE PREFERRED EMBODIMENTS

Referring to the drawings, a tension tie 1 is shown for holding a wood frame member 2 subject to a design load in tension to a tension attachment member 66 connected to a building member 4. The tension tie consists of: (a) an elongated strap member 5 formed with attachment openings 6 adapted for receipt of attachment members such as nails therethrough which are indicated by arrows 7 for connection to the wood frame member and a rivet opening 8 adjacent one end; (b) rivet means 9 including a rivet 10 dimensioned for receipt in the rivet opening 8 of the strap member; (c) a continuous seat member 11 formed with an opening 12 adapted for receipt therethrough of the tension attachment member 66 anchored to the building member 4; (d) a first side member 13 integrally connected to a first portion 14 of the seat member 11 and forming a generally right angle therewith; (e) a first back member 15 having a length substantially greater than the length of the seat 11 integrally connected to the first side member 13 and forming a generally right angle therewith and formed with a spaced first rivet opening 16 adapted for receipt therethrough of rivet 10; (f) a second side member 17 integrally connected to a second portion 18 of the seat member 11 disposed on opposite sides of the seat opening 12 and forming a generally right angle to the seat member, and the second side member 17 is generally parallel to the first side member 13; (g) a second back member 19 having a length substantially greater than the length of the seat member and integrally connected to the second side member 17 and forming a generally right angle therewith, and the second back member 19 is substantially parallel and closely adjacent to the first back member 15, and is formed with a second rivet opening 20 adapted for receiving the rivet member 10, and at least a portion of the second back member 19 overlaps a portion of the first back member 15 wherein the second rivet opening 20 in the overlapping portion of the second back member 19 is in alignment with the first rivet opening 16 in the first back member 15; and (h) the rivet 10 holds the first and second back members 15 and 19 together and connects the strap member 5 to the first and second back members and transfers the design load in shear substantially evenly to the first and second overlapped back members.

Figure 7:
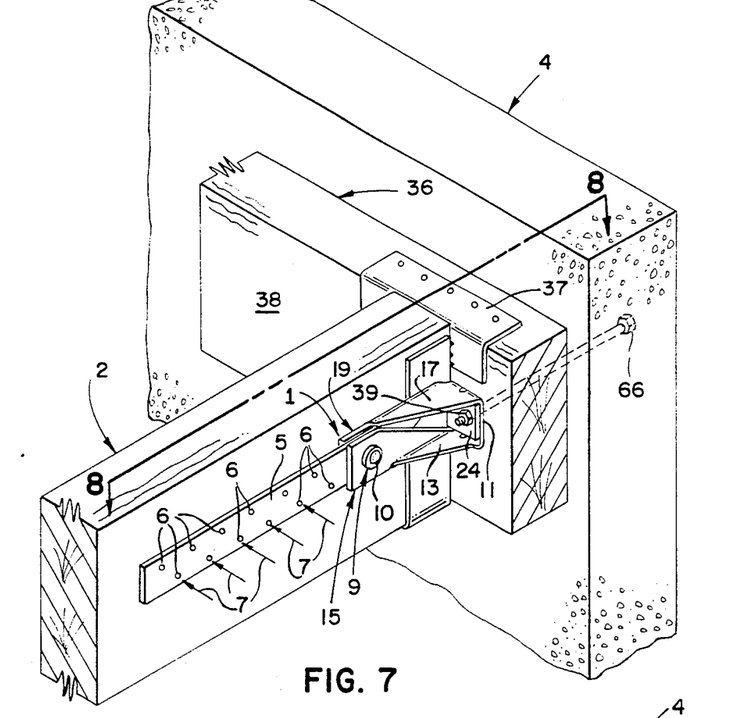
FIG. 7 is a perspective view showing a typical installation of the tension tie of the present invention.
Figure 8:
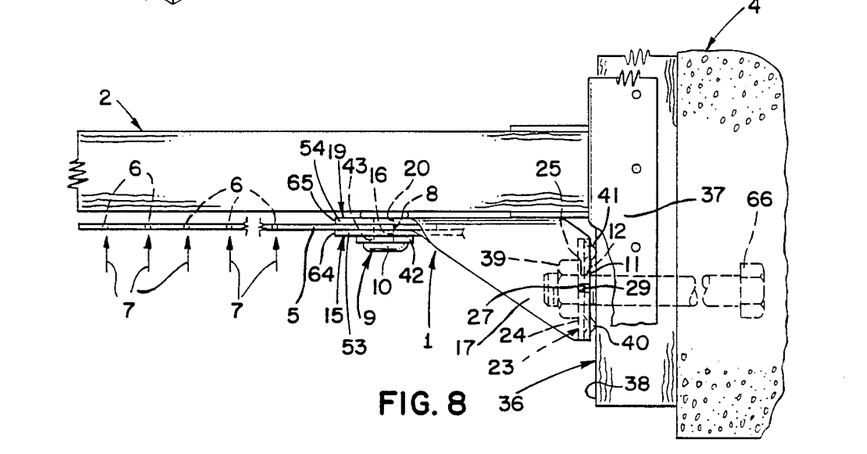
FIG. 8. is a side view of the installation of the tension tie shown in FIG. 7.

The tension tie is most commonly used in anchoring a joist member 2 to a concrete wall as shown in FIGS. 7 and 8 of the illustrations. The tension tie, however, could also anchor a joist member to a wood supporting beam or a stud to a foundation.

As shown in the drawings, the first and second side members 13 and 17 may be attached to the seat member 11 at first selected angles shown by double arrows 21 and 22 which are generally equal and greater than 90 degrees so that the sides taper outwardly. It is not essential that the sides taper.

In a preferred form of the invention, the tension attachment member is a threaded bolt 66 embedded in a concrete wall The tension tie is best connected to the bolt 66 by providing a clamping means 23. The clamping means as shown in the drawings may consists of a washer, and in the preferred form, the clamping means consists of a substantially rigid washer member 24 dimensioned for face to face registration with the seat member 11, dimensioned for receipt between the side members and formed with an opening 25 therethrough adapted for receipt of the attachment member 66 anchored to the foundation. Preferably, the washer member 24 is substantially equal in area and configuration to the seat member 11 having side edges 31, 32, 45 and 46.

Figures 1, 9:
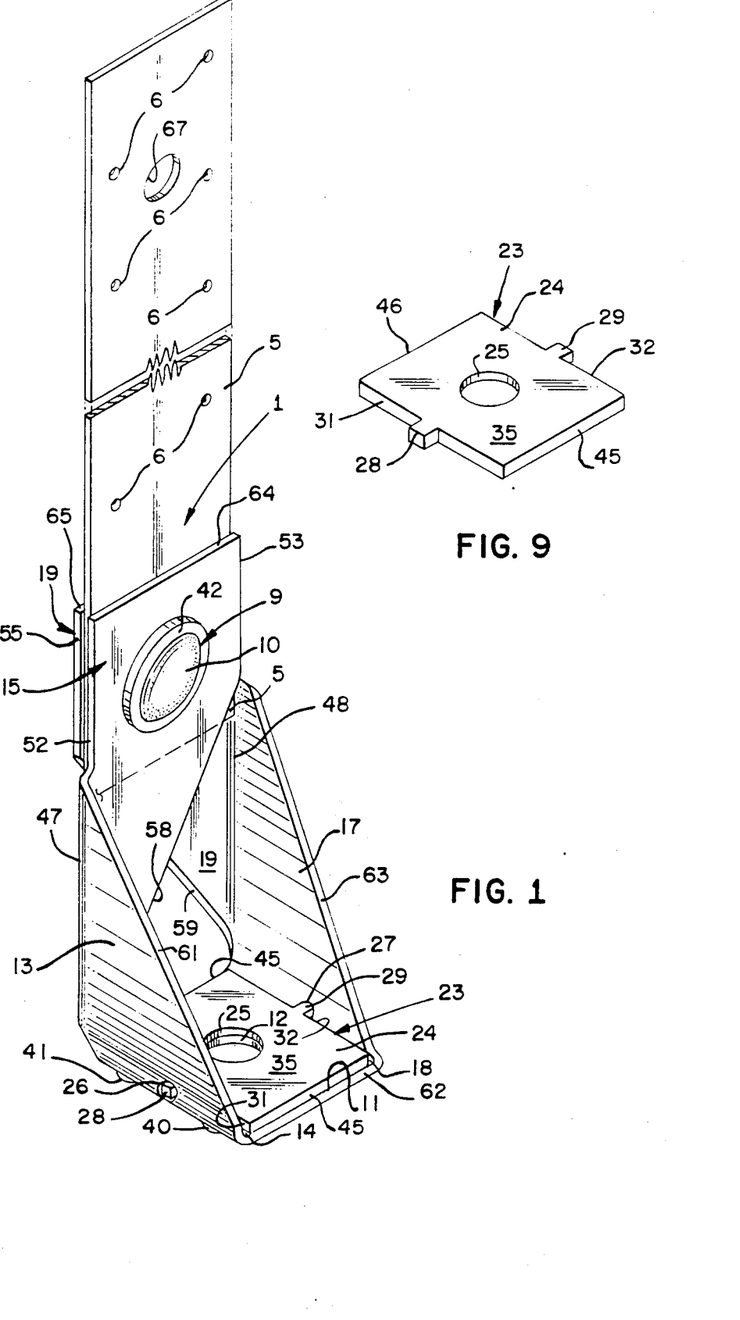
FIG. 1 is a perspective view of the tension tie of the present invention. A repetitive portion of the strap member has been removed so that it will fit on the drawing sheet.
FIG. 9 is a perspective view of a washer used in the tension tie member of the present invention.
Figures 2, 3, 3A:
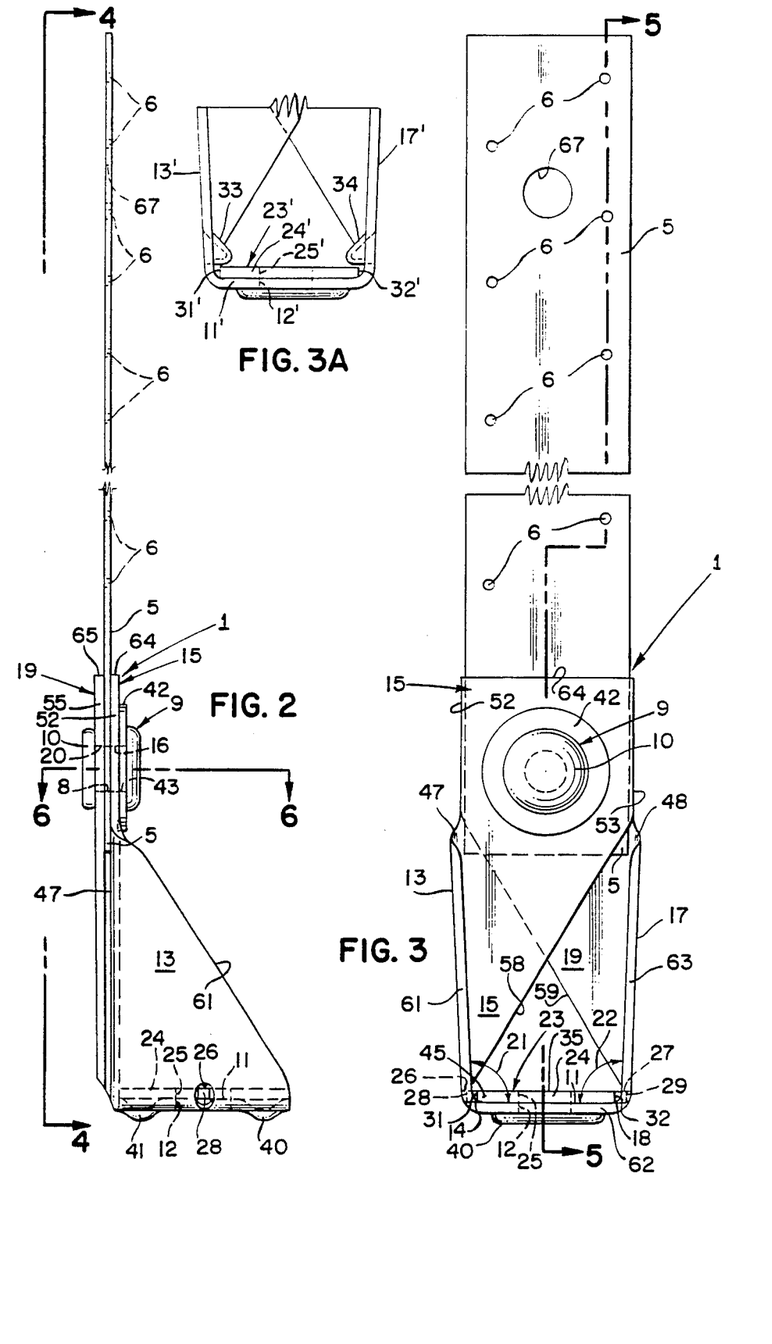
FIG. 2 is a side view of the tension tie shown in FIG. 1. A repetitive portion of the strap tie has been removed.
FIG. 3 is a front elevation view of the Tension Tie shown in FIG. 2. A repetitive portion of the strap member has been removed.
FIG. 3a is a front elevation view of a portion of a modified form of the invention similar to the view shown in FIG.

The washer member is preferably manufactured so that it is affixed to the seat member. A preferred way is illustrated in FIG. 3A. Washer 24' is preferably substantially the same area and configuration as the seat member 11'. The washer is formed with opening 25' which is in registration with opening 12' in the seat 11'. The side edges 31' and 32' of washer 24' are in close proximity to sides 13' and 17' so that indents 33 amd 34 in sides 13' and 17' will engage the top surface 35' of washer 24'. Note that protrusions 28 and 29 shown in the washer illustrated in FIG. 9 are not needed on the washer of the preferred form of the invention.

In still another form of the invention, the first and second side members 13 and 17 are formed with openings 26 and 27 adjacent the seat member 11 and the washer member 24 is formed with protrusions 28 and 29 dimensioned and positioned for locking registration with openings 26 and 27 in the first and second side members 13 and 17.

The tension tie member of the present invention is preferably constructed from light gauge galvanized sheet metal. Tension tie members having an average ultimate load of 11,800 pounds, a normal allowable load of 3,240 pounds and a maximum allowable load of 4,320 pounds may also be constructed from 12 gauge steel but the washer should be constructed from 7 gauge steel. The length of the strap may be 27 11/16 " and connected to a bolt $\frac{5}{8}$" in diameter. Twenty four 16d nails 7 may be used to connect the strap to the wood member. Bolt holes 67 are punched in the strap member 5 for the receipt of bolts therethrough as an alternate form of attachment.

An example of the manner in which the present invention is used is illustrated in FIGS. 7 and 8. Ledger board 36 is attached to concrete wall 4 by bolts or other suitable attachment means. The wood frame member 2, such as a wood joist or purlin, is connected to the ledger board by a standard metal hanger 37. Since the standard metal hanger provides minimal resistance to pull out, the tension tie of the present invention solves this problem where seismic or wind loads may cause the imposition of large forces parallel to the longitudinal axis of the beam 2. Seat member 11 is placed against the planar face 38 of ledger board 36 and bolt 66 embedded in concrete wall 4 is inserted through openings 12 in the seat and 25 in washer 24. Nut 39 is threaded onto the threaded end of bolt 66 and tightened against the top surface 35 of the washer. Nails 7 are then driven through openings 6 in strap 5 into the carried member 2.

An advantage of attaching the strap member 5 to the back members 15 and 19 by a rivet 10 is the fact that the same back members may be used with a plurality of strap members of different lengths. For example, strap lengths of 17", 22", 27½", and 33½" may be used with back members and develop maximum allowable loads respectively of 2,160, 3,240, 3,960 and 5,400 pounds.

Seat member 11 is preferably formed with indentations 40 and 41 which are arranged on either side of opening 12.

Rivet means 9 should preferably be provided with a washer 42 having an opening 43 to prevent the pull out of the rivet.

Figure 10:
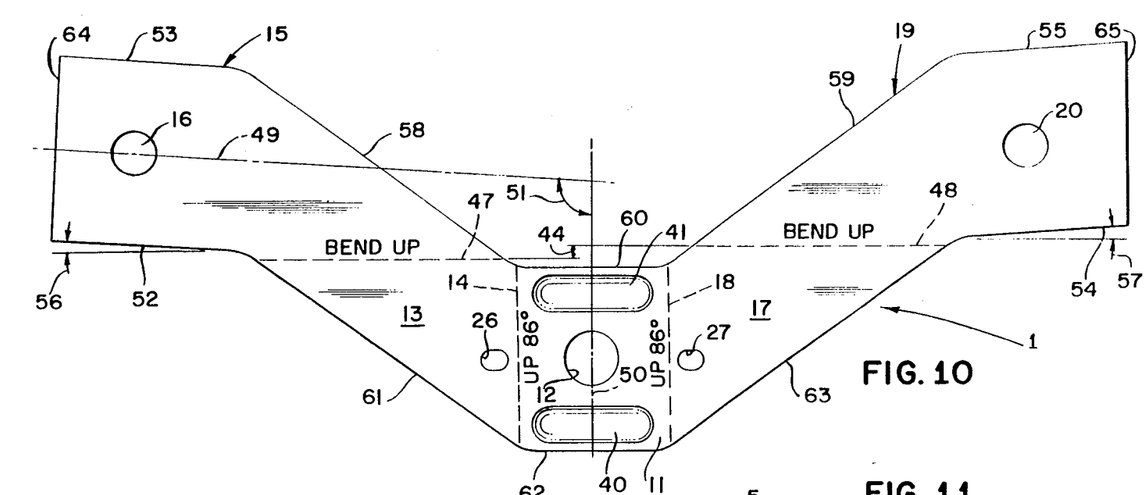
FIG. 10 is a plan view of the blank member of part of the tension tie prior to bending.
Figure 11:
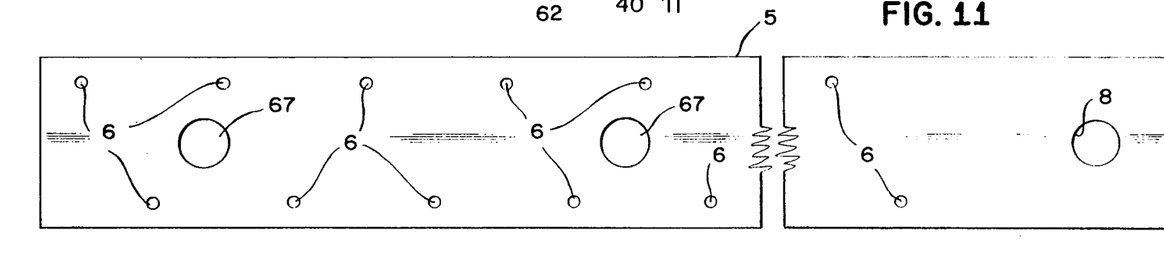
FIG. 11 is a plan view of the blank member of the strap member part of the tension tie. A repetitive portion of the strap member has been removed so as to fit on the drawing sheet.

In order to permit folding of second back member 19 behind first back member 15 and insure registration of rivet openings 16 and 20, bend lines 47 and 48 are offset a slight distance as indicated by spaced arrows 44 shown in FIG. 10.

Figures 4, 5, 6:
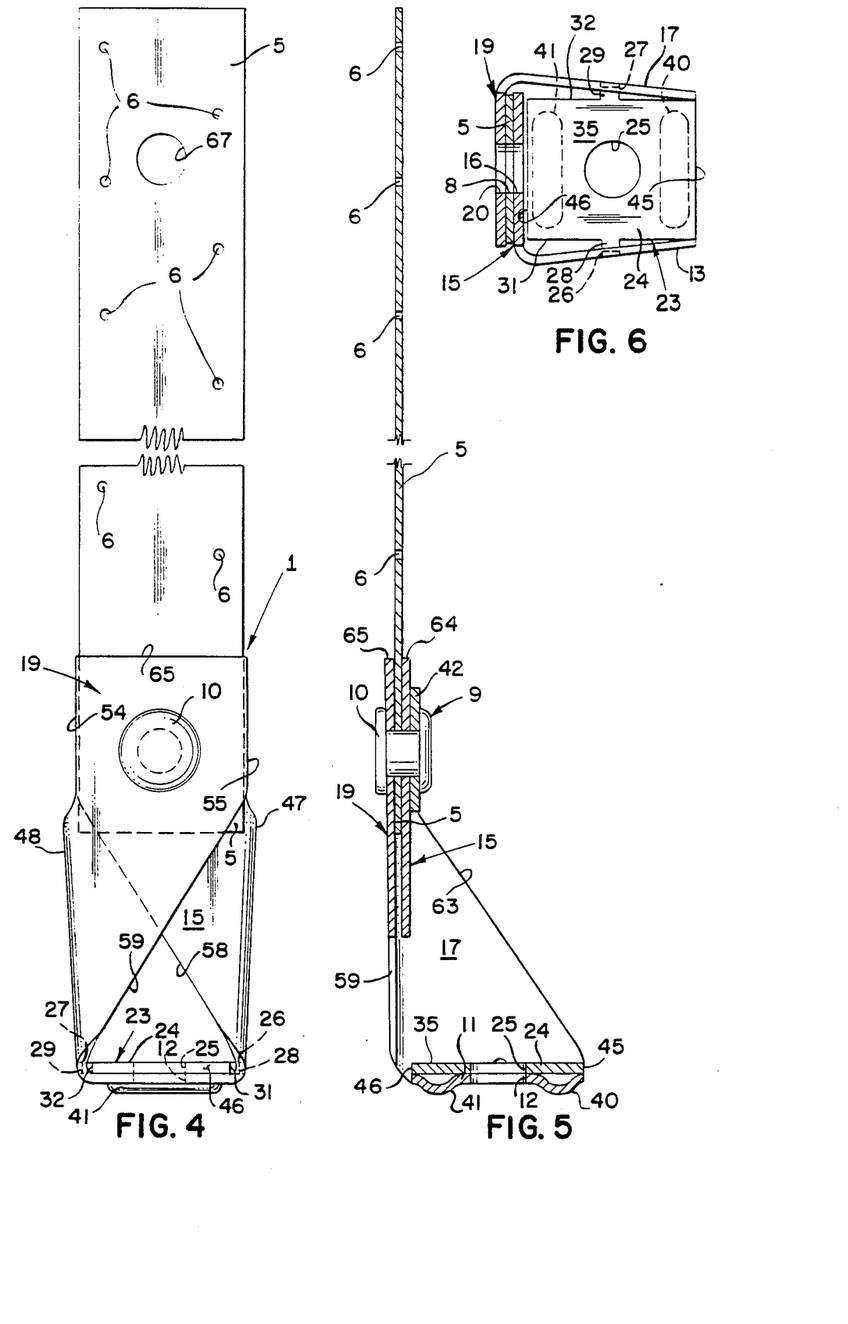
FIG. 4 is a rear elevation view of the tension tie shown in FIG. 3. A repetitive part of the strap member has been removed.
FIG. 5 is a cross sectional view taken along line 5—5 of FIG. 3 A repetitive portion of the strap member has been removed.
FIG. 6 is a cross sectional view taken along line 6—6 of FIG. 2.

As shown in FIGS. 3 and 4, the first and second back members are formed to provide a substantial opening adjacent the seat area and substantially in the plane of the back members. This opening is created by bending the back members along bend lines 47 and 48 and in bounded by side edges 58 and 59 and the back edge 60 of the seat.

First rivet opening 16 is formed in the first back member along center line 49. Center line 49 is oriented with respect to center line 50 of the seat opening so as to form a second selected angle 51 on the sheet metal blank which is substantially equal to first selected angles 21 and 22. As shown in FIG. 10, angle 51 equals about 92 ½ degrees.

In forming the blank as shown in FIG. 10, side edges 52 and 53 of first back member 15 should be cut at an angle 56 of about 2 ½° with respect to bend line 47 and side edges 54 and 55 of second back member 19 should be cut at an angle 57 of about 2 ½° with respect to bend line 48. The front edge of first side member 13 is indicated by the number 61, the front edge of second side member 17 is indicated by number 63 and the front edge of seat member 11 is indicated by the number 62.

First back member 15 terminates at edge 64, and second back member 19 terminates at edge 65.

I claim:
1. A wood-to-concrete or wood tension tie for holding a wood frame member subject to a design load in tension to a tension attachment member held by a wood or concrete building member comprising:
   a. an elongated strap member having a planar face formed with attachment openings adapted for receipt of shear attachment members therethrough for connection to said wood frame member and a connection rivet opening adjacent one end;
   b. connection means dimensioned for receipt in said connection opening of said strap member;
   c. continuous seat member having a thickness sufficient to form a relatively rigid structure formed with a seat opening adapted for receipt therethrough of said tension attachment member anchored to said wood or concrete building member and for holding said tension attachment member without deforming under selected design loads;

d. a first side member having a generally triangular shape in a plane positioned at a right angle to said planar face of said enlongated strap member integrally connected to a first portion of said seat member and forming a generally right angle therewith further rigidizing said seat member;

e. a first back member having a planar face positioned in a plane parallel to said planar face of said elongated strap member and having a length substantially greater than the length of said seat member integrally connected to said first side member and forming a generally right angle therewith and formed with a spaced first connection opening adapted for receipt therethrough of said connection means;

f. a second side member having a generally triangular shape in a plane positioned at a right angle to said planar face of said elongated strap member and integrally connected to a second portion of said seat member disposed on opposite sides of said seat opening and forming a generally right angle to said seat member further rigidizing said seat member, and said second side member is generally parallel to said first side member;

g. a second back member having a planar face positioned in a plane parallel to said planar face of said first back member and said elongated strap member and having a length substantially greater than the length of said seat member and integrally connected to said second side member and forming a generally right angle therewith, and said second back member is substantially parallel and closely adjacent to said first back member, and is formed with a second connection opening adapted for receiving said connection means, and at least a portion of said second back member overlaps a portion of said first back member wherein said second connection opening in said overlapping portion of said second back member is in alignment with said first connection opening in said first back member; and h. said connection member holds said first and second back members together and connects said strap member to said first and second back members and transfers said design load in shear substantially evenly to said first and second overlapped back members.

2. A tension tie for holding a wood frame member subject to a design load in tension to a tension attachment member held by a wood or concrete building member comprising:

a. an elongated strap member formed with attachment openings adapted for receipt of shear attachment members therethrough for connection to said wood frame member and a connection rivet opening adjacent one end;

b. connection means dimensioned for receipt in said connection opening of said strap member;

c. a continuous seat member formed with a seat opening adapted for receipt therethrough of said tension attachment member anchored to said wood or concrete building member;

d. a first side member integrally connected to a first portion of said seat member and forming a generally right angle therewith;

e. a first back member having a length substantially greater than the length of said seat member integrally connected to said first side member and forming a generally right angle therewith and formed with a spaced first connection opening adapted for receipt therethrough of said connection means;

f. a second side member integrally connected to a second portion of said seat member disposed on opposite sides of said seat opening and forming a generally right angle to said seat member, and said second side member is generally parallel to said first side member;

g. a second back member having a length substantially greater than the length of said seat member and integrally connected to said second side member and forming a generally right angle therewith, and said second back member is substantially parallel and closely adjacent to said first back member, and is formed with a second connection opening adapted for receiving said connection means, and at least a portion of said second back member overlaps a portion of said first back member wherein said second connection opening in said overlapping portion of said second back member is in alignment with said first connection opening in said first back member;

h. said connection member holds said first and second back members together and connects said strap member to said first and second back members and transfers said design load in shear substantially evenly to said first and second overlapped back members;

i. a washer member dimensioned and positioned for engaging a substantial portion of said seat area, formed with a washer opening in registration with said opening in said seat member, and dimensioned and positioned adjacent a portion of said first and second side members; and j. portions of said first and second side members are formed with inwardly protruding indents dimensioned and positioned for engagement with said washer member for holding said washer member to said seat member.

3. A wood-to concrete or wood structural tension tie for joining a wood frame member subject to a design load in tension to a tension attachment member held by a wood or concrete building member comprising:

a. an elongated strap member having a planar face formed with attachment openings adapted for receipt of attachment members therethrough for connection to said wood frame member and a rivet opening adjacent one end;

b. rivet means including a rivet dimensioned for receipt in said rivet opening of said strap member;

c. a continuous seat member having a thickness sufficient to form a relatively rigid structure having first and second side edges and formed with a seat opening on a centerline parallel with said side edges adapted for receipt therethrough of a tension attachment member anchored in said wood or concrete building member and for holding said tension attachment member without deforming under selected design loads;

d. a first side member having a generally triangular shape in a plane positioned at a right angle to said planar face of said elongated strap member and integrally connected to said first side edge of said seat member and forming a first selected angle therewith greater than 90° so as to taper outwardly further rigidizing said seat member;

e. a first back member having a planar face positioned in a plane parallel to said planar face of said elongated strap member and having a length substantially greater than the length of said seat member and integrally connected to said first side member and forming a generally right angle therewith and formed with a first rivet opening formed along a centerline and adapted for receipt therethrough of said rivet member;

f. said first back member includes a lower portion which is attached to said first side member and an upper portion which extends beyond said first side member;

g. a second side member having a generally triangular shape in a plane positioned at a right angle to said planar face of said elongated strap member and integrally connected to said seat member along said second side edge of said seat member and forming an angle therewith generally equal to said first selected angle further rigidizing said seat member;

h. a second back member having a planar face positioned in a plane parallel to said planar face of said first back member and said elongated strap member and having a length substantially greater than the length of said seat member and integrally connected to said second side member and forming a generally right angle therewith, and said second back member in substantially parallel and closely adjacent to said first back member, and is formed with a second rivet opening adapted for receiving said rivet, and at least a portion of said second back member overlaps a portion of said first back member wherein said second rivet opening in said overlapping portion of said second back member is positioned in registration with said first rivet opening in said first back member; and i. said rivet holds said first and second back members together and connects said strap member to said first and second back members and transfers said design load in shear substantially evenly to said first and second overlapped back members.

4. In a wood frame building structure, the connection resisting tension forces acting on said frame comprising:

a. a first elongated wood structural member having a generally planar face and subject to said tension force acting in an assumed design loading generally parallel to said elongated wood structural member;

b. a second structural member adjacent said first structural member;

c. a tension attachment member held by said second structural member and having an end protruding from said second structural member;

d. an elongated strap member formed with attachment openings adapted for receipt of attachment members therethrough for connection to said wood structural member and a rivet opening adjacent one end;

e. rivet means including a rivet dimensioned for receipt in said rivet opening of said strap member;

f. a sheet metal holdown connector constructed from a single planar sheet metal member formed by bending along substantially straight bend lines including:

(1) a continuous seat member formed with a seat opening adapted for receipt therethrough of said protruding end of said tension member;

(2) a first side member integrally connected to said seat member and forming a generally right angle therewith;

(3) a first back member having a length substantially greater than the length of said seat member and integrally connected to said first side member and forming a generally right angle therewith and formed with a first rivet opening;

(4) a second side member integrally connected to said seat member and forming a generally right angle therewith, and said second side member is generally parallel to said first side member; and (5) a second back member having a length substantially greater than the length of said seat member and integrally connected to said second side member and forming a generally right angle therewith, and said second back member is substantially parallel and closely adjacent to said first back member and at least a portion of said second back member overlaps a portion of said first back member, and said overlapping portion is formed with a second rivet opening in alignment with said first rivet opening in said first back member;

in said first back member and said second rivet opening in said second back member and said rivet opening in said strap member joining said first and second back members together and joining said back members to said strap member and for evenly transferring said design loading in shear to said first and second overlapped back members;

h. a plurality of attachment members inserted through said openings in said elongated strap member and into said first elongated wood structural member; and i. clamping means connected to said protruding end of said tension attachment member connecting said seat member of said holdown connector to said second structural member.

5. A sheet metal wood-to-concrete structural tension tie for joining a wood frame member to a concrete wall comprising:

a. an elongated strap member formed with attachment openings adapted for receipt of attachment members therethrough for connection to said wood joint member and a rivet opening adjacent one end;

b. rivet means including a rivet dimensioned for receipt in said rivet opening of said strap member;

c. a continuous seat member formed with an opening adapted for receipt therethrough of an attachment member anchored in said concrete wall;

d. a first side member integrally connected to said seat member and forming a generally right angle therewith;

e. a first back member integrally connected to said first side member and forming a generally right angle therewith and formed with a first rivet opening for receipt therethrough of said rivet;

f. a second side member integrally connected to said seat member and forming a generally right angle therewith, and said second side member is generally parallel to said first side member;

g. a second back member integrally connected to said second side member and forming a generally right angle therewith, and said second back member is substantially parallel and closely adjacent to said first back member, and is formed with a second rivet opening for receiving said rivet, and at least a portion of said second back member overlaps a portion of said first back member wherein said second rivet opening in said overlapping portion of said second back member is in alignment with said first rivet opening in said first back member and said rivet opening in said strap member for connection of said strap member to said back members by said rivet;

h. said first and second rivet openings in said first and second back members are circular in shape and said rivet member is circular in shape and sized for close registration with said openings;

i. said seat member has a generally rectangular shape;

j. a substantially rigid washer member dimensioned for face to face registration with said seat member, dimensioned for receipt between said side members and formed with an opening therethrough adapted for receipt of said attachment member anchored to said foundation;

k. said washer member is substantially equal in area and configuration to said seat member;

l. said first and second side members are formed with openings adjacent said seat member; and m. said washer member is formed with protrusions dimensioned and positioned for locking registration with said openings in said first and second side members.

6. A tension tie as described in claim 5 wherein:

a. said tenion tie member is formed from light gauge galvanized sheet metal.

7. A sheet metal tension tie for joining a wood frame member to a concrete wall comprising:

a. an elongated strap member formed with attachment openings adapted for receipt of attachment members therethrough for connection to said wood joint member and a rivet opening adjacent one end;

b. rivet means including a rivet dimensioned for receipt in said rivet opening of said strap member;

c. a seat member formed with an opening- adapted for receipt therethrough of an attachment member anchored in said concrete wall;

d. a first side member integrally connected to said seat member and forming a generally right angle therewith;

e. a first back member integrally connected to said first side member and forming a generally right angle therewith and formed with a first rivet opening adapted for receipt therethrough of said rivet member;

f. a second side member integrally connected to said seat member and forming a generally right angle therewith, and said second side member is generally parallel to said first side member;

g. a second back member integrally connected to said second side member and forming a generally right angle therewith, and said second back member is substantially parallel and closely adjacent to said first back member, and is formed with a second rivet opening for receiving said rivet, and at least a portion of said second back member overlaps a portion of said first back member wherein said second rivet opening in said overlapping portion of said second back member is in alignment with said first rivet opening in said first back member;

h. said rivet is inserted in said opening in said strap member and said openings in said back members for joining said strap member and said first and record back members;

i. a rectangular washer member having an area substantially equal dimensionally and in configuration to said seat member;

j. locking means formed in said washer; and k. latch means formed in said side member adjacent said seat member for locking attachment of said washer to said seat member.

8. A sheet metal wood-to-concrete structural tension tie for joining a wood frame member to a concrete wall comprising:

a. an elongated strap member formed with attachment openings adapted for receipt of attachment members therethrough for connection to said wood joint member and a rivet opening adjacent one end;

b. rivet means including a rivet dimensioned for receipt in said rivet opening of said strap member;

c. a seat member formed with an opening adapted for receipt therethrough of an attachment member anchored in said concrete wall;

d. a first side member integrally connected to said seat member and forming a generally right angle therewith;

e. a first back member integrally connected to said first side member and forming a generally right angle therewith and formed with a first rivet opening for receipt therethrough of said rivet;

f. a second side member integrally connected to said seat member and forming a generally right angle therewith, and said second side member is generally parallel to said first side member;

g. a second back member integrally connected to said second side member and forming a generally right angle therewith, and said second back member is substantially parallel and closely adjacent to said first back member, and is formed with a second rivet opening, and at least a portion of said second back member overlaps a portion of said first back member wherein said second rivet opening in said overlapping portion of said second back member is in alignment with said first rivet opening in said first back member;

h. said rivet is inserted through said opening in said strap member and said first and second rivet openings is said first and second back members for connecting said strap member to said back member;

i. a substantially rigid washer member dimensioned for face to face registration with said seat member, dimensioned for receipt between said side members and formed with an opening therethrough adapted for receipt of said attachment member anchored to said concrete wall;

j. said washer member is substantially equal in area and configuration to said seat member;

k. said rectangular washer member is formed with a pair of parallel side edges and protrusions extending outwardly from each of said side edges;

l. latch means including a pair of openings formed in said side members for registration with said washer member protrusions; and m. said seat member is formed with a pair of parallel embossments spaced on oposite sides of said opening in said seat member and extending from said first to said second side in generally parallel arrangment.

* * * * *

UNITED STATES PATENT AND TRADEMARK OFFICE
CERTIFICATE OF CORRECTION

PATENT NO. : 4,744,192

DATED : May 17, 1988

INVENTOR(S) : Alfred D. Commins

It is certified that error appears in the above-identified patent and that said Letters Patent is hereby corrected as shown below:

Column 1, line 68, after the words "in FIG." insert ---3.---

Column 3, line 14, after the words "concrete wall" insert ---.---

Column 3, line 16, change the word "consists" to ---consist---

Column 4, line 29, change the word "in" to ---is---

Column 10, line 2, change the word "record" to ---second---

Column 10, line 47, change the word "is" to ---in---

Column 10, line 67, change the word "arrangment" to ---arrangement---

UNITED STATES PATENT AND TRADEMARK OFFICE
CERTIFICATE OF CORRECTION

PATENT NO. : 4,744,192

DATED : May 17, 1988

INVENTOR(S) : Alfred D. Commins

It is certified that error appears in the above-identified patent and that said Letters Patent is hereby corrected as shown below:

Column 7, line 28, change the word "in" to ---is---

Column 8, line 25, before the words "in said" insert ---g. a rivet member inserted through said first opening---

Signed and Sealed this

Twentieth Day of September, 1988

Attest:

DONALD J. QUIGG

Attesting Officer

Commissioner of Patents and Trademarks